(12) United States Patent
Mathew et al.

(10) Patent No.: US 7,577,222 B2
(45) Date of Patent: Aug. 18, 2009

(54) METHODS AND APPARATUS WITH LOGIC TO DETERMINE A RELATIVE CHANGE RELATIONSHIP BETWEEN MODEM AND FRAME CLOCKS

(75) Inventors: Philip P. Mathew, San Jose, CA (US); Baraa Al Dabagh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 11/131,660

(22) Filed: May 17, 2005

(65) Prior Publication Data

US 2006/0262888 A1    Nov. 23, 2006

(51) Int. Cl.
    *H04L 7/00*    (2006.01)
(52) U.S. Cl. ........................... 375/358; 370/507
(58) Field of Classification Search ......... 375/221–222, 375/354, 356, 362, 377, 358; 370/328, 350, 370/503, 507–512
    See application file for complete search history.

(56) References Cited

U.S. PATENT DOCUMENTS

| 5,852,630 | A  | * | 12/1998 | Langberg et al. ............. 375/219 |
| 6,510,163 | B1 | * | 1/2003  | Won ........................... 370/466 |
| 2002/0114301 | A1 |   | 8/2002 | Yee et al. |
| 2002/0114354 | A1 | * | 8/2002 | Sinha et al. .................. 370/503 |
| 2003/0016699 | A1 | * | 1/2003 | McClary et al. ............. 370/474 |
| 2006/0025080 | A1 | * | 2/2006 | Sutskover et al. ............. 455/69 |

* cited by examiner

*Primary Examiner*—Chieh M Fan
*Assistant Examiner*—James M Perez
(74) *Attorney, Agent, or Firm*—Schwabe, Williamson & Wyatt, P.C.

(57) ABSTRACT

Methods and apparatus to determine a relative change relationship between modem and frame clocks are generally described herein. Other embodiments may be described and claimed.

14 Claims, 5 Drawing Sheets

STATIONS 12/14

METHODS AND APPARATUS WITH LOGIC TO DETERMINE A RELATIVE CHANGE RELATIONSHIP BETWEEN MODEM AND FRAME CLOCKS

BACKGROUND

1. Technical Field

Embodiments of the present invention are related to the field of electronic devices, and in particular, to communication devices.

2. Description of Related Art

A broadband wireless access (BWA) system provides a point-to-multipoint communication system in a communications network. BWA systems typically use microwave and millimeter wave technology to transmit communication signals from a wireless base station to one or more subscriber stations. A BWA system may transmit various types of digital signals including video, voice, television, Internet and other data signals. In one configuration, the BWA system may transmit data received at a fixed rate from one or more communications links, such as from T1, E1 and J1 lines. One such BWA system is defined by Institute of Electrical and Electronic Engineers (IEEE) 802.16, An Interface for Fixed Broadband Wireless Access Systems, revised Oct. 1, 2004.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1:
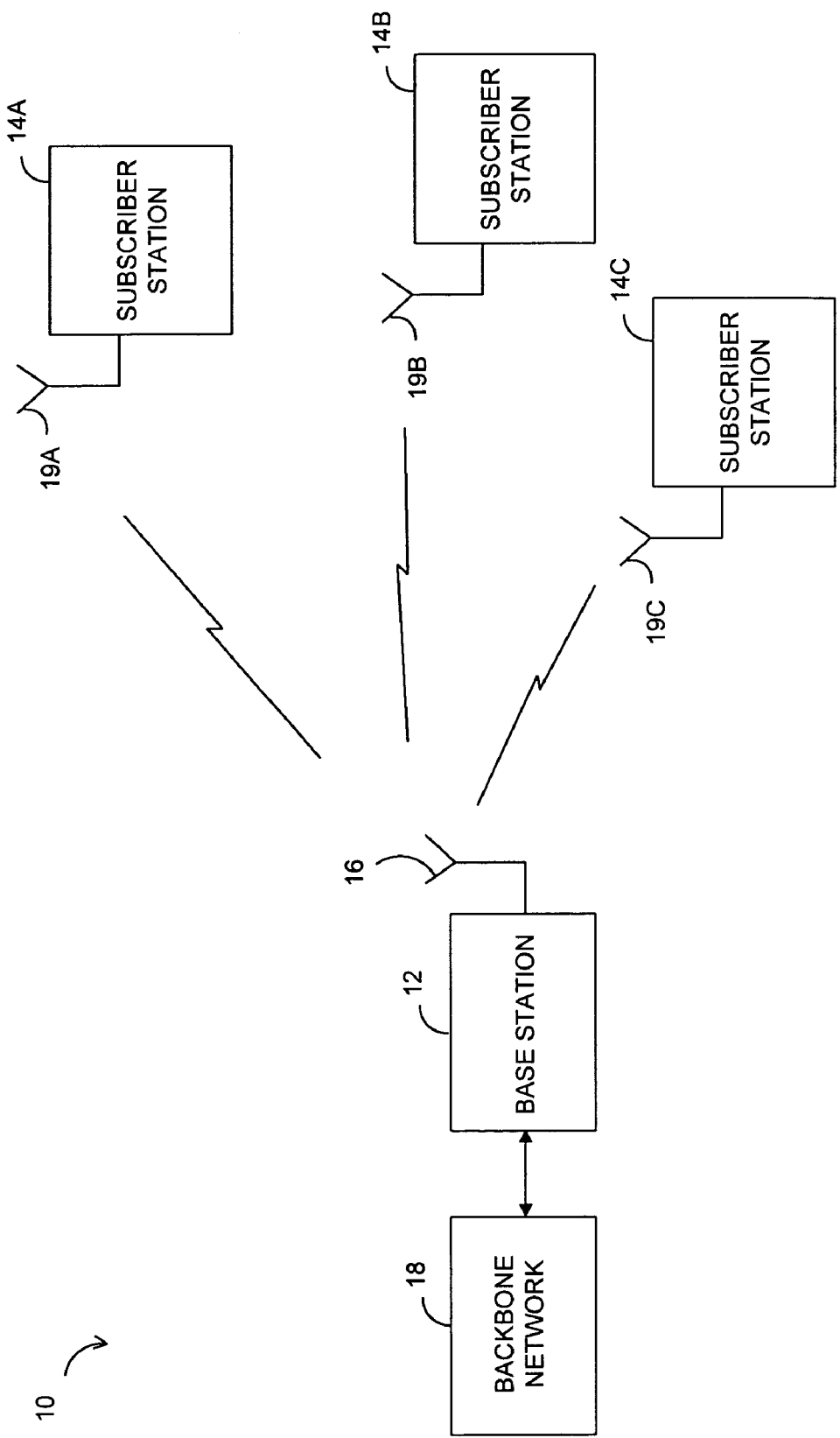
FIG. 1 is an illustrative diagram of a broadband wireless access (BWA) system according to one embodiment of the present invention.

With reference to FIG. 1, a broadband wireless access (BWA) system 10 is shown. The BWA system 10 may use wireless cells to cover geographic areas. The BWA system 10 may include a base station 12 at a central site location transmitting to a plurality of subscriber stations 14 (generally shown as 14A, 14B and 14C) at remote site locations. The base station 12 may have a receive/transmit antenna 16 to receive wireless communication signals from the subscriber stations 14 and to transmit wireless communication signals to the subscriber stations 14. In another embodiment, there may be separate receive and transmit antennas. The base station 12 may collect traffic to and from the subscriber stations 14 within a cell. The base station 12 may include an interface to the wired or wireless backbone network 18, which may provide a link between the subscriber stations 14 and the backbone network 18. Each of the subscriber stations 14 may include an antenna 19 (illustrated by antennas 19A, 19B, and 19C). The antenna 19 may receive and transmit a wireless communication signal from and to the base station 12. In one embodiment, the antennas 16 and 19 may be omnidirectional antennas. In one embodiment, the base station 12 may have a number of omnidirectional antennas 16, with there being one omnidirectional antenna 16 for each of the cells. Hence, transmissions to and from the omnidirectional antennas 16 may be directional in nature so that transmission may be directed toward particular cells.

In one embodiment, elements of the BWA system 10 may communicate with each other in accordance with the communication protocol of the IEEE 802.16 standard. In one embodiment, synchronously transmitted data may be received by the base station 12 at a fixed rate from a communications link, such as the T1, E1, and/or J1 lines ("synchronous data lines"). For example, a framer or transceiver, such as a T1/E1/J1 framer, in the backbone network 18 may transmit and receive data to and from the base station 12 in time division multiplexing (TDM) data frames over the synchronous data line. In one embodiment, the BWA system 10 may send and receive data using Asynchronous Transfer Mode (ATM), with such packetized data including the previously-described fixed rate data of the synchronous data lines, along with other data, such as internet protocol (IP) packets.

Figure 2:
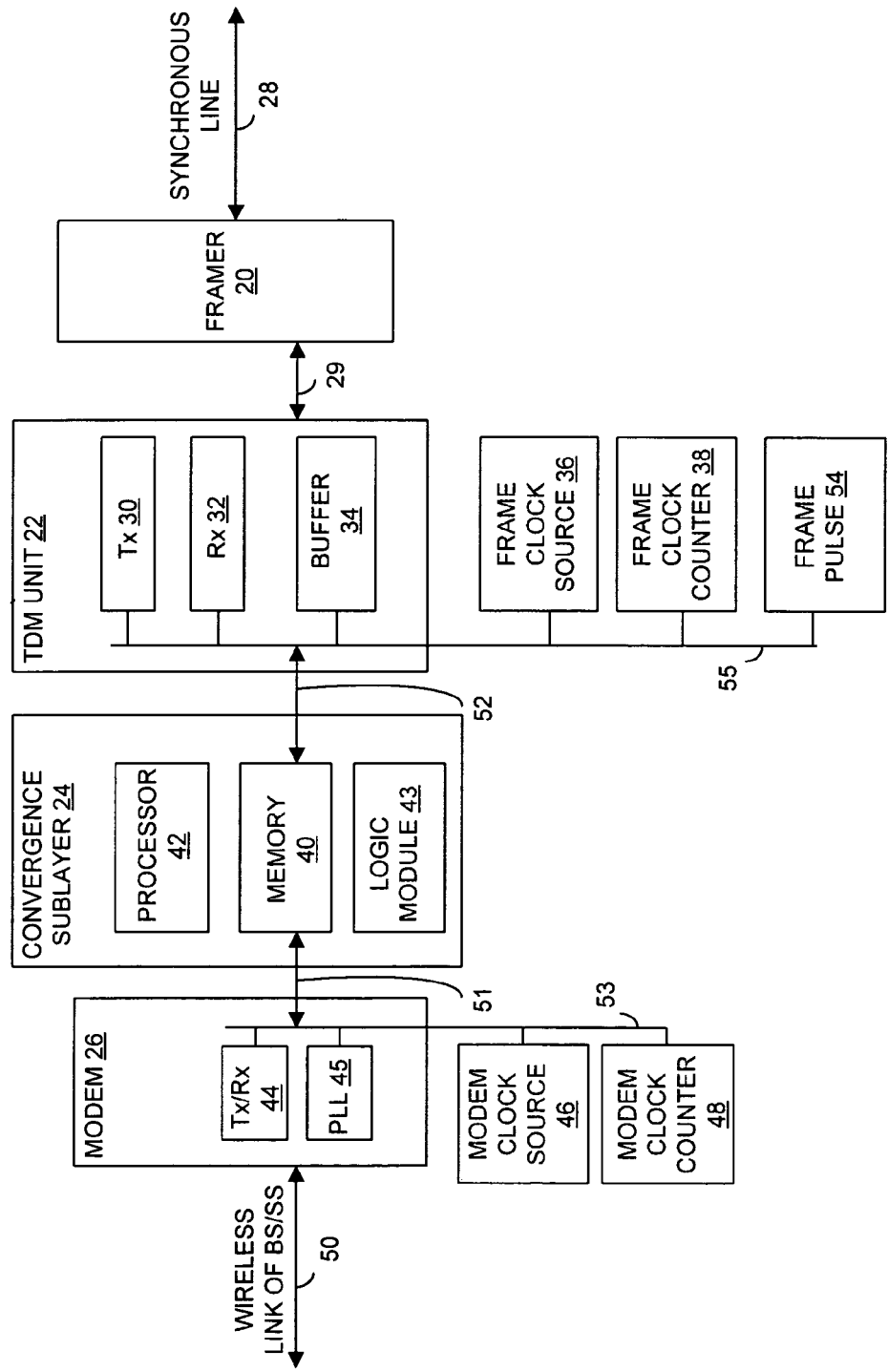
FIG. 2 is a block schematic diagram of a station in the broadband wireless access system of FIG. 1 according to one embodiment of the present invention.

Referring to FIG. 2, an overview block schematic diagram is shown which is representative of the base station 12 and/or one of the subscriber stations 14 of the BWA system shown in FIG. 1, in accordance with various embodiments. The same components in the base and subscriber stations 12 and 14 will be distinguished by the use of the terms "base" and "subscriber", respectively, but will have the same reference numerals. When these terms are not used with a common component, then the description of that component will be applicable to both the base station 12 and the subscriber station 14. The term "data frame" shall refer to a T1, E1 or J1 TDM data frames or any other data frame transmitted with a fixed data rate to be clocked by a frame clock signal. The frame clock signal may define the data rate. In the example of a T1, E1 or J1 data frame, the frame clock source may be referred to as a T1, E1, or J1 frame clock. The term "data" shall include all digital information, including but not limited to digitized voice, digital data, and digitized images. For ease of understanding, wireless communication signals sent from the base station 12 to the subscriber stations 14 are sent in a "downstream" direction and wireless communication signals sent from one of the subscriber station 14 to base station 12 are sent in an "upstream" direction. However, such signal transmission direction convention shall not be limiting on the scope of the claims.

The stations 12/14 may each include a framer 20, a TDM unit ("multiplexer unit") 22, a convergence sublayer 24, and a modem 26. The framer 20 may receive and transmit analog data frames having a fixed data rate over a synchronous line 28. In one embodiment, the framer 20 may be a T1, E1 or J1 framer to receive and transmit TDM analog data frames, with the line 28 being a T1, E1, or J1 line, respectively. TDM analog data frames may include a plurality of channels, with the channels of the analog data frame corresponding to different voice channels (telephone lines) or data channels.

However, the framer 20 may receive analog data frames from other synchronous data sources having a fixed data rate.

The framer 20 may receive the incoming analog data frames and recover the appropriate data and pass it on to a TDM unit 22. More specifically, the framer 20 may undertake an analog-to-digital conversion (ADC) for the incoming analog data frames from the line 28. The framer 20 may receive a frame clock signal from the TDM unit 22 for sampling the incoming analog data frames and a frame pulse (to be described hereinafter) to generate digital data signals or digital data frames. The framer 20 then may send digital data frames to the TDM unit 22 through a Pulse Code Modulation (PCM) bus 29. Likewise, the TDM unit 22 may send digital data frames to the framer 20. In this case, the framer 20 may provide a digital-to-analog (DAC) conversion for the digital data frames coming from the TDM unit 22 to generate analog data frames. In the case of the base station 12, the synchronous line 28 may terminate in another framer (not shown) in the backbone network 18 of FIG. 1. In the case of the subscriber station 14, the subscriber station 14 may be a residential gateway, such as at a small office or central office; hence, TDM data frames may be received and transmitted to and from the framer 20 of the subscriber station 14.

In one embodiment, the TDM unit 22 may include a transceiver having a transmit (Tx) portion 30 and a receive (Rx) portion 32. The TDM unit 22 may also include a buffer 34 coupled to the Rx/Tx portions 30 and 32. A frame clock source 36 may be coupled to the TDM unit 22. A frame clock counter 38 may be coupled to the frame clock source 36 and the convergence sublayer 24. The TDM unit 22 may be coupled to the framer 20, and the modem 26 through the convergence sublayer 24. In one embodiment, the convergence sublayer 24 may include a memory 40, a processor 42, and a logic module 43. The modem 26 may include a transceiver (Tx/Rx) 44 and a phase-lock loop 45. A modem clock source 46 may be coupled to the modem 26. A modem clock counter 48 may be coupled to the modem clock source 46 and the convergence sublayer 24. The modem 26 may be coupled to a wireless link 50. The base station 12 may be on one side of the wireless link 50 and the subscriber station 14 may be on the other side of the wireless link 50. The processor 42, memory 40, and logic module 43 are shown to be in communication with the modem 26 and the TDM 22 by way of connections 51 and 52, respectively. Likewise, the components within the modem 26, modem clock 46, and modem counter 48 may be interconnected by way of connections 53. The components of the TDM 22, the framer clock 36, the framer counter 38 and a frame pulse source 54 may be interconnected by connections 55. For example, the logic module 43 may be connected via these connections to the modem counter 48 and the frame counter 38 so as to read these counters 48 and 38, as will be described hereinafter.

The absolute frame clock frequencies of the base and subscriber frame clock sources 36 may differ between the base station 12 and the subscriber station 14. As a result, the data rates at the stations 12 and 14 may differ. In one illustrative case, this difference may be due to the fluctuations between the frame clock sources 36. For transmitting a data frame through the BWA system 10, the subscriber frame clock source 36 ideally is in sync with the base frame clock source 36. As will be described hereinafter, in various embodiments, synchronization of the base and subscriber frame clock sources 36 may be accomplished by adjusting the frequency of the subscriber frame clock source 36 to match the frequency of the base frame clock source 36.

In one embodiment, the wireless link 50 may be divided into a downstream channel (transmitting in a downstream direction from the base station to the subscriber station) and an upstream channel (transmitting in an upstream direction from the subscriber station to the base station) using frequency division duplexing (FDD) by the base and subscriber modems 26. FDD may provide a separate frequency assignment for the upstream and downstream channels. FDD may provide a continuous transmission in the downstream channel. In one embodiment, the downstream and upstream channels may have a number of TDM slots allocated by the base TDM unit 22 to the various subscriber stations 14. Data for each of the subscriber station 14 may be multiplexed into the same data stream by the base station 12 and then extracted by each subscriber station 14 based on the time slot assigned to the subscriber station 14. This may be referred to as time division duplexing (TDD) and is described in more detail in FIG. 5.

To generate a downstream transmission from the base station 12, the base modem 26 may modulate a carrier with a baseband signal (the bits of the data stream of the digital data frames) from the TDM unit 22 using a modulation scheme, such as quadrature amplitude modulation (QAM), to generate a modulated signal. Consequently, a data frame received over the line 28 by the base station 12 for transmission to one of the subscriber stations 14 becomes encoded in the modulated signal. The carrier may be a single frequency carrier or may be a multiple frequency carrier utilizing, for example, Orthogonal Frequency Division Multiplexing (OFDM). The subscriber modem 26 may demodulate the modulated signal received over the downstream channel with a demodulator of the transceiver 44 to obtain, for example, the transmitted digital data frame. The base and subscriber modems 26 may be configured in a reverse manner to provide for a modulated signal on the upstream channel from one or more of the subscriber stations 14 to the base station 12. Therefore, the modulated signal transmitted from one of the subscriber stations 14 may include encoded data in the form of encoded data frames.

The base and subscriber modems 26 may have the base and subscriber modem clock sources 46, respectively, which are synchronized. In one embodiment, the base and the subscriber modem clock sources 46 may be phase locked by using a phase lock loop (PLL) 45 in the subscriber modem 26. A data preamble may be included in the transmitted data, which may be used by the PLL 45 to obtain synchronization. The base and the subscriber stations 12 and 14 may include the base and subscriber frame clock sources 36, respectively, which generate a base and a subscriber frame clock signal, respectively. As previously mentioned, in one embodiment, the frame clock sources may be E1, T or J1 frame clock sources. For example, the base and subscriber frame clock sources 36 may run at 2.048 MHz. In one embodiment, the frame clock sources 36 may be numerically controlled oscillators (NCOs). In one embodiment, the rate of the frame clock sources 36 may derive from remote data sources. In another embodiment, the rate of the frame clocks may be separately set at the base and subscriber stations 12 and 14. The frame clock sources 36 also may be used by other applications to find the speed of the clock oscillator.

The base frame clock source 36 may be used by the base TDM unit 22 to receive/transmit digital data frames from/to the base framer 20 (coupled to the backbone network 18) by transferring the digital data frames to/from the internal base buffer 34 within the base TDM unit 22. In various embodiments, a software application executed by the base processor 42 may read these digital data frames from the base buffer 34 and store them in the base computer memory 40. These data frames may be read from the base computer memory 40 by the base convergence sublayer 24 and sent to the base modem 26, so that the base modem 26 may transmit them to air over the wireless link 50. At the subscriber station 14, the opposite happens. Data frames received through the subscriber modem 26 may be saved in the subscriber computer memory 40 of the subscriber station 14 and an application executed by the subscriber processor 42 may read these data frames and send them to the subscriber buffer 34 of the subscriber TDM unit 22. The subscriber TDM unit 22 may read the data frames from the subscriber buffer 34 and send them over the subscriber line 28 to another transceiver (not shown) through the subscriber TDM unit 22.

The frame pulse source 54 may be coupled to the frame clock counter 38 and the convergence sublayer 24. To delineate the end of one data frame and the beginning of the next data frame, a frame pulse may be generated by the frame pulse source 54 for every data frame in the base and subscriber TDM units 22. In other words, in one embodiment, a frame pulse is generated every 125 microseconds.

In various embodiments, to achieve substantial synchronization of the base and subscriber frame clock sources 36, the frame clock sources may be synchronized by "piggybacking" on the synchronization of the base and subscriber modem clock sources 46, as will be described hereinafter. In general, a "relative change relationship" may be measured between the base modem clock source 46 and the base frame clock source 36 in the base station 12. This relative change relationship may be transmitted to the subscriber station 14. In the subscriber station 14, the subscriber frame clock source 36 may be adjusted until the transmitted relative change relationship is established between the subscriber modem clock source 46 and the subscriber frame clock source 36. In one embodiment, a change in the base frame clock source 36 during a first sample time period relative to a change in the base modem clock source 46 during the first sample time period may form the basis of the transmitted relationship. In response to the transmitted relationship, the rate of the subscriber frame clock source 36 may be adjusted until the same relative change relationship exists between the subscriber modem clock source 46 and the subscriber frame clock source 36 in the subscriber station 14. In other words, a ratio of a change in the subscriber frame clock source 36 to a change in the subscriber modem clock source 46 during a second sample time period may be adjusted so that this ratio is the same as the ratio of the change of the base frame clock source 36 to the base modem clock source 46 during the first sample time period.

In various embodiments, the base station 12 may include a base frame clock counter 38 to count the clock periods of the base frame clock source 36 and a base modem clock counter 48 to count the clock periods of the base modem clock source 46. The subscriber station 14 may include a subscriber frame clock counter 38 to count the clock periods of the subscriber frame clock source 36 and a subscriber modem clock counter 48 to count the clock periods of the subscriber modem clock source 46. The counted clock periods may be referred to as "clock period data." The subscriber frame clock counter 38 and the subscriber modem clock counter 48 may be used in the synchronization of the subscriber frame clock source 36 in the subscriber station 14, as will be described hereinafter. The base and subscriber frame clock counters 38 may be incremented at the frame clock frequency of the respective stations.

Figures 3A, 3B:
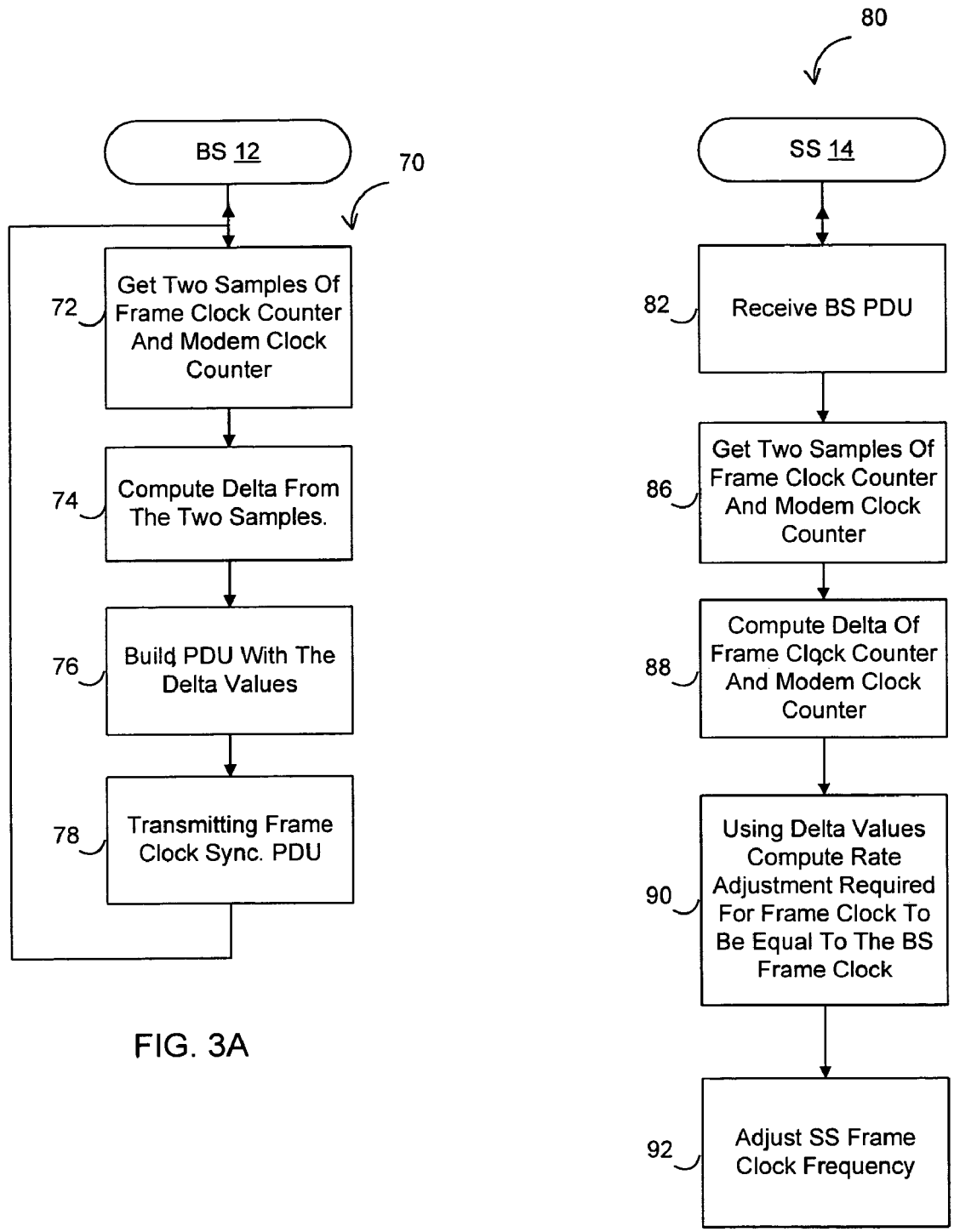
FIGS. 3A is a flow chart of part of a synchronization process implemented in a base station of the BWA system and FIG. 3B is a flow chart of a part of the synchronization process implemented in a subscriber station of the BWA system according to one embodiment of the present invention.

Referring to FIG. 2 and flow charts in FIGS. 3A and 3B, a synchronization process, in accordance with various embodiments, is shown for synchronizing the subscriber frame clock source 36 with the base frame clock source 36. The flow chart of FIG. 3A illustrates the base station (BS) logic (part of the synchronization process) for synchronizing the frame clock sources 36. The flow chart of FIG. 3B illustrates the subscriber station (SS) logic (rest of the synchronization process) for synchronizing the frame clock sources 36. The base modem clock counter 48 and the base frame clock counter 38 may be read by the logic module 43 at every data frame pulse in the base station 12. The subscriber modem clock counter 48 and the subscriber frame clock counter 38 may be read by the logic module 43 at every data frame pulse in the subscriber station 12. In the following calculations, the clock period readings (samples) of the base and subscriber modem clock counters 48 may be referred to as "bFEU" and "sFEU", respectively. The term "FEU" refers to modem "front end unit", which is another name for the modem 26. Likewise, the clock period readings (samples) of the base and the subscriber frame clock counters 38 may be referred to as "bTDM" and "sTDM", respectively. The term "TDM" refers to the clock period readings being from the frame clock counter 38 of the "TDM" unit 22.

Referring to FIGS. 2 and 3A, the following portion of the synchronizing process may be practiced at the base station 12, in accordance with various embodiments. In the flow chart 70 of FIG. 3A, at 72, a first base sample of the base modem clock counter 48 (clock period reading bFEU1) and a first base sample of the base frame clock counter 38 (clock period reading bTDM1) may be taken at a first base sample time (e.g., in response to a first base frame pulse). A second base sample of the base modem clock counter 48 (clock period reading bFEU2) and a second base sample of the base frame clock counter 38 (clock period reading bTDM2) may be taken at a second base sample time (e.g., in response to a second base frame pulse). In summary, at the base station 12, two consecutive samples of the base modem clock counter 48 and two samples of the base frame clock counter 38 may be read during two consecutive frame pulses. Although consecutive frame pulses may be used, this does not need to be the case (e.g., one or more frame pulses may occur between samples). However, both first samples should be taken at the same time and both second samples should be taken at the same time.

At 74, the difference (delta) between the two base modem clock counter samples (clock period readings bFEU2 and bFEU1) and the difference (delta) between the two base frame clock counter samples (clock period readings bTDM2 and bTDM1) may be found. With dbFEU being the difference of the two modem clock counter samples of the base station, then:

$$dbFEU = bFEU2 - bFEU1 \quad \quad \text{Equation 1}$$

and with dbTDM being the difference of the two frame clock counter samples of the base station, then $$dbTDM = bTDM2 - bTDM1. \quad \quad \text{Equation 2}$$

At 76, a frame clock synchronization Protocol Data Unit (PDU) or frame synchronization wireless frame may be generated to include the above deltas (dbTDM and dbFEU). At 78, the frame clock sync PDU may be transmitted (broadcasted) to all the subscriber stations 14. The process of 72-78 may be repeated.

Referring to FIGS. 2 and 3B, the following portion of the synchronizing process may be practiced at the subscriber station 14, in accordance with various embodiments. In the flow chart 80 of FIG. 3B, at 82 the frame clock Sync PDU is received at the subscriber station 14 from the base station 12. The values of dbTDM and dbFEU may be stored in the subscriber memory 40 of the subscriber station 14.

At 86, a first subscriber sample of the subscriber modem clock counter 48 (clock period reading sFEU1) and a first subscriber sample of the subscriber frame clock counter 38 (clock period reading sTDM1) may be taken at a first subscriber sample time (e.g., in response to a first subscriber frame pulse in the subscriber station). A second subscriber sample of the subscriber modem clock counter 48 (clock period reading sFEU2) and a second subscriber sample of the subscriber frame clock counter 38 (clock period reading sTDM2) may be taken at a second subscriber sample time (e.g., in response to a second subscriber frame pulse in the subscriber station). In summary, the subscriber station 14 may read two consecutive samples of the subscriber modem clock counter 48 and two samples of the subscriber frame clock counter 38 during two consecutive frame pulses. Although consecutive frame pulses may be used, this does not need to be the case. However, both first samples should be taken at the same time and both second samples should be taken at the same time. The sample times of the subscriber station 14 and the base station 12 may be different.

At 88, a difference in the two pairs of samples taken in the subscriber station 14 may be determined. With dsFEU being the difference of two subscriber modem clock counter samples of the subscriber station 14, then:

$$dsFEU = sFEU2 - sFEU1 \qquad \text{Equation 3}$$

With dsTDM being the difference of the two subscriber frame clock counter samples of the subscriber station 14, then:

$$dsTDM = sTDM2 - sTDM1. \qquad \text{Equation 4}$$

At this point, a more detailed explanation of the relative change relationship between the modem clock sources 46 and the frame clock sources 36 will be provided. The difference dbFEU is a change in the base modem clock count during a first sample time period. The difference dbTDM is a change in the base frame clock count during the same first sample time period. Hence, a relative change relationship between the base modem clock source 46 and the base frame clock source 36 may be established by generating the two differences dbFEU and dbTDM, both being determined during the same sample time period. This sample time period may be achieved by taking the first base samples at the same time (e.g., at the same frame pulse) and taking the second base samples at the same time (e.g., at a subsequent frame pulse). More specifically, a given change in the base frame clock source 36 may be expected for a given change in the base modem clock source 46. With the frequencies of the base and subscriber modem clock sources 36 being synchronized, if the frequencies of the base and subscriber frame clock sources 46 also are synchronized, then the same relative change relationship has been established in the subscriber station 14. For example, when both the frame and modem clock sources are synchronized, then:

$$dbTDM/dbFEU = dsTDM/dsFEU \qquad \text{Equation 5}$$

Synchronization of the frame clock sources may be achieved by adjusting the subscriber frame clock source 36 so that the above equation is substantially true. This may be accomplished by a number of calculations with one calculation being described hereinafter.

With respect to the above described samples, there is a first sample time period between the first and second base samples in the base station. Likewise, there is a second sample time period between the first and second subscriber samples in the subscriber station. The first and second sample time periods need not occur at the same time. Although the first and second sample time periods substantially may have the same duration (both defined by consecutive frame pulses, but in different stations), in other embodiments, the durations may differ. By the base frame clock source 36 in the base station 12 being a master clock source, a plurality of subscriber stations 14 may adjust their subscriber frame clock sources 36 to be synchronized with the base frame clock source, since the frame clock sync PDU may be broadcasted to the plurality of subscriber stations 14. One illustrative set of calculations for establishing synchronization using the transferred relationship between the base frame clock source and the base modem clock source will now be described.

At 90, a value (dsFEU1) may be calculated to equal a value of the subscriber modem clock counter (dsFEU) if the subscriber frame clock counter (dsTDM) is set to have the same value as the base frame clock counter (dbTDM):

$$dsFEU1 = (dsFEU/dsTDM)*dbTDM. \qquad \text{Equation 6}$$

By comparing the value of the dsFEU1 computed at 100 with the base modem clock counter, dbFEU, the relative speed of the subscriber frame clock with respect to the base frame clock may be determined (i.e. whether the base frame clock is faster or slower compared to the subscriber station frame clock).

If dsFEU1 value is greater than the dbFEU value, the subscriber modem clock counter in the subscriber station is incremented more than the base modem clock counter of the base station for the subscriber frame clock counter to reach the same value as the base frame clock counter. That is, the subscriber frame clock is running at a slower rate than the base frame clock. In this case, the subscriber frame clock rate may be incremented (+) to match with the base frame clock rate.

On the other hand, if the dsFEU1 value is smaller than the dbFEU value, it generally means for the subscriber frame clock counter to reach the same value as of the base frame clock counter, the base frame clock counter in the base station is incremented at a slower rate than the subscriber frame clock counter in the subscriber station for the subscriber frame clock counter to reach the same value as the base frame clock counter. Hence, the subscriber station frame clock rate may be decremented (−) to match with the base station frame clock rate.

Based upon the above, the percentage value of the clock rate adjustment (in other words, the percentage of the frame clock rate adjustment (rTDM) required at the subscriber station) may be computed. This is the difference between the subscriber modem clock and the base modem clock and is referred to as rTDM:

$$rTDM = ((dsFEU1 - dbFEU)/dbFEU)*100. \qquad \text{Equation 7}$$

Using this rate, a new subscriber frame clock frequency may be calculated. As noted above, the current subscriber frame clock frequency is rTDM % of the base frame clock frequency. Hence, to adjust the subscriber frequency to the base frequency, the base frame clock frequency is computed. Let fsTDM be the current frame clock frequency of the subscriber station in megahertz (MHz), and fbTDM be the current frame clock frequency of the base station in MHz. Although the subscriber station does not know the base station frequency yet, the subscriber station may compute its own frequency (fsTDM), and also its percent difference with respect to the base frequency. The subscriber frame clock frequency (fsTDM) may be computed, provided the following is known: the clock frequency of the subscriber modem (fsFEU), delta (dsFEU) of two modem clock counter samples and delta (dsTDM) of two frame clock counter samples. A time T, taken for the modem clock counter delta value dsFEU when the modem clock runs at a frequency value of fsFEU, may be computed. More specifically, a counter runs at clock rate. If the frequency of the modem clock (fsFEU) (per second) and the clock counter delta value (dsFEU) are known, how much time it takes for the modem clock to increment one cycle. i.e. 1/fsFEU seconds may be computed. Then (1/fsFEU)*dsFEU is the time (T) taken for the modem counter delta (dsFEU) value, which may be the same time taken for the frame counter delta value (dsTDM). From the computed time T and the TDM delta (dsTDM), the current frequency of the subscriber station TDM clock (fsTDM) can be computed, e.g., 1/((T/dsTDM)). The frame clock counter may take the same time T for the delta, dsTDM. From this, the frequency of the subscriber station fsTDM may be computed in MHz.

Using the fsTDM and rTDM values, the base station frequency may be calculated as follows:

$$fbTDM=(fsTDM*100)/(100+rTDM).$$ Equation 8

At 92, the subscriber station clock frequency may be set to the fbTDM value computed at 90. The subscriber station may repeat the above synchronization algorithm periodically to adjust the fluctuations of the base station and the subscriber station clocks.

Referring to FIG. 2, in one embodiment, the above described synchronization algorithm may be implemented in the logic module 43 of the convergence sublayer 24. In one embodiment, the logic module 43 may comprise computer programs stored in the base and subscriber memories 40 and executed by the base and subscriber processors 42. In another embodiment, the logic module 43 may be hardwired. In one embodiment, an Application Specific Integrated Circuit (ASIC) may be used for implementing the TDM unit 22 and the modem 26. The framer 20 may be separately implemented or may be part of the ASIC. A limited amount of computing overhead may be needed to synchronize the frame clocks of the base station 12 and the subscriber station 14 in this BWA system 10. An overhead of the processor 42 may be limited in terms of the number of packets to be created and the amount of data to be exchanged between the base station and its subscriber station to synchronize the clock sources is limited. Since the base modem, base frame, subscriber modem, and subscriber frame counters may be read during the frame pulse, the computing cycles of the processor in the stations may not be wasted for polling of the counter values.

Figure 4:
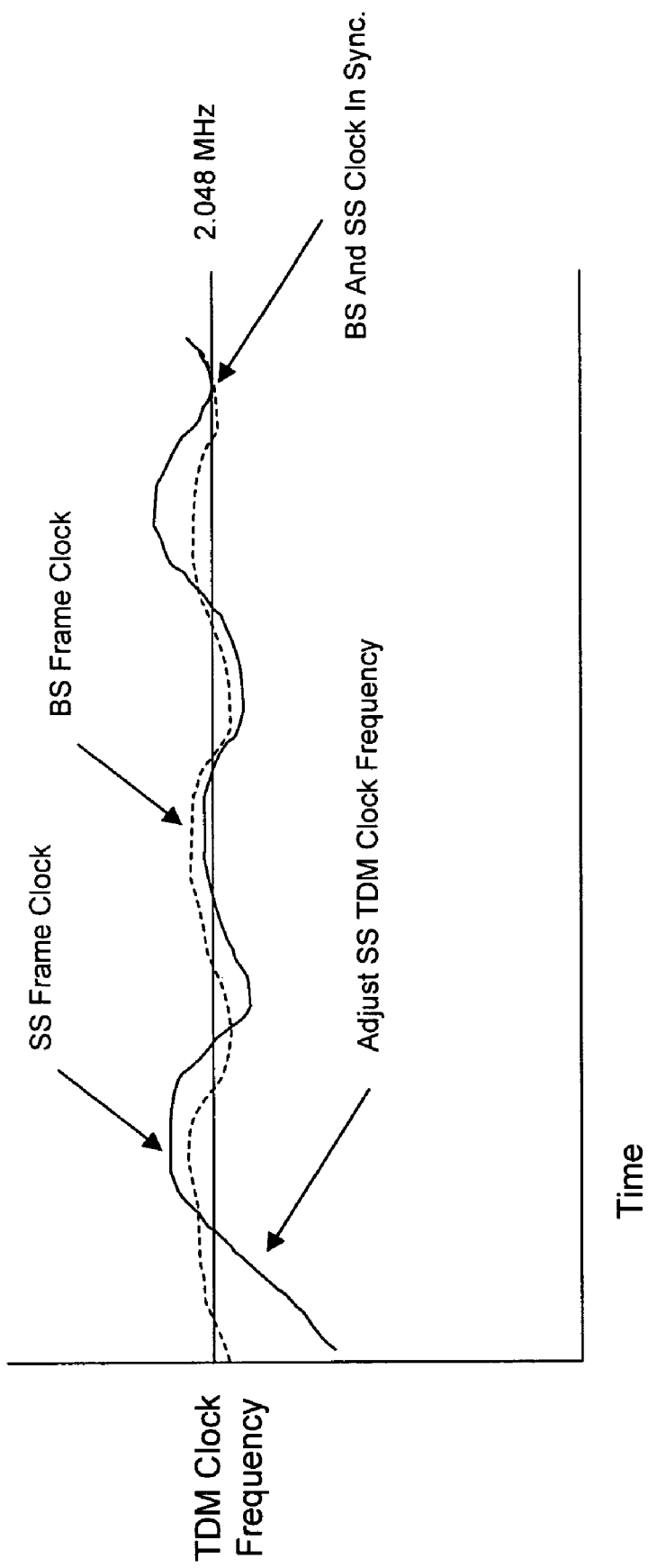
FIG. 4 is a graph of frame clocks in the base station and the subscriber station of the BWA system being synchronized according to one embodiment of the present invention.

Referring to FIG. 4, the frame clock synchronization process of the base station and subscriber station is illustrated by a diagram. This diagram shows how a subscriber station frame clock may be adjusted to synchronize with the base station frame clock. The desired frequency of 2.048 MHz is shown by a straight line on the frame clock frequency axis (vertical axis). Time is shown on the horizontal axis. The base station is designated by BS and the subscriber station is designated by SS. With the frame clock source of the base station acting as a master clock source, the frame clock frequency of one the subscriber station is shown adjusted in FIG. 4, although each of the subscriber stations may correspondingly adjust its frame clock frequency to that of the frame clock source of the base station.

In one embodiment, the TDM data frame of the T1/E1/J1 line 28 may have a number of channels. In a T1 data frame, there may be 24 channels and in an E1 data frame, there may be 32 channels. Each channel may consist of 8 bit data or voice. The data/voice may be sampled at 8000 samples/second; therefore, each channel may carry 8000*8 bits=64 kbps of data. One frame may carry a maximum of 64*32 kbps in case of E1 lines or 64*24 kbps in case of T1 lines. J1 lines may run at 2.048 Mbps and may support 30 voice channels. Each data frame may be sent out by the T1/E1/J1 framer over the T1, E1 or J1 lines at 125 microseconds. T1 lines may be used in the United States, E1 lines may be used in Europe, and J1 lines may be used Japan.

Figure 5:
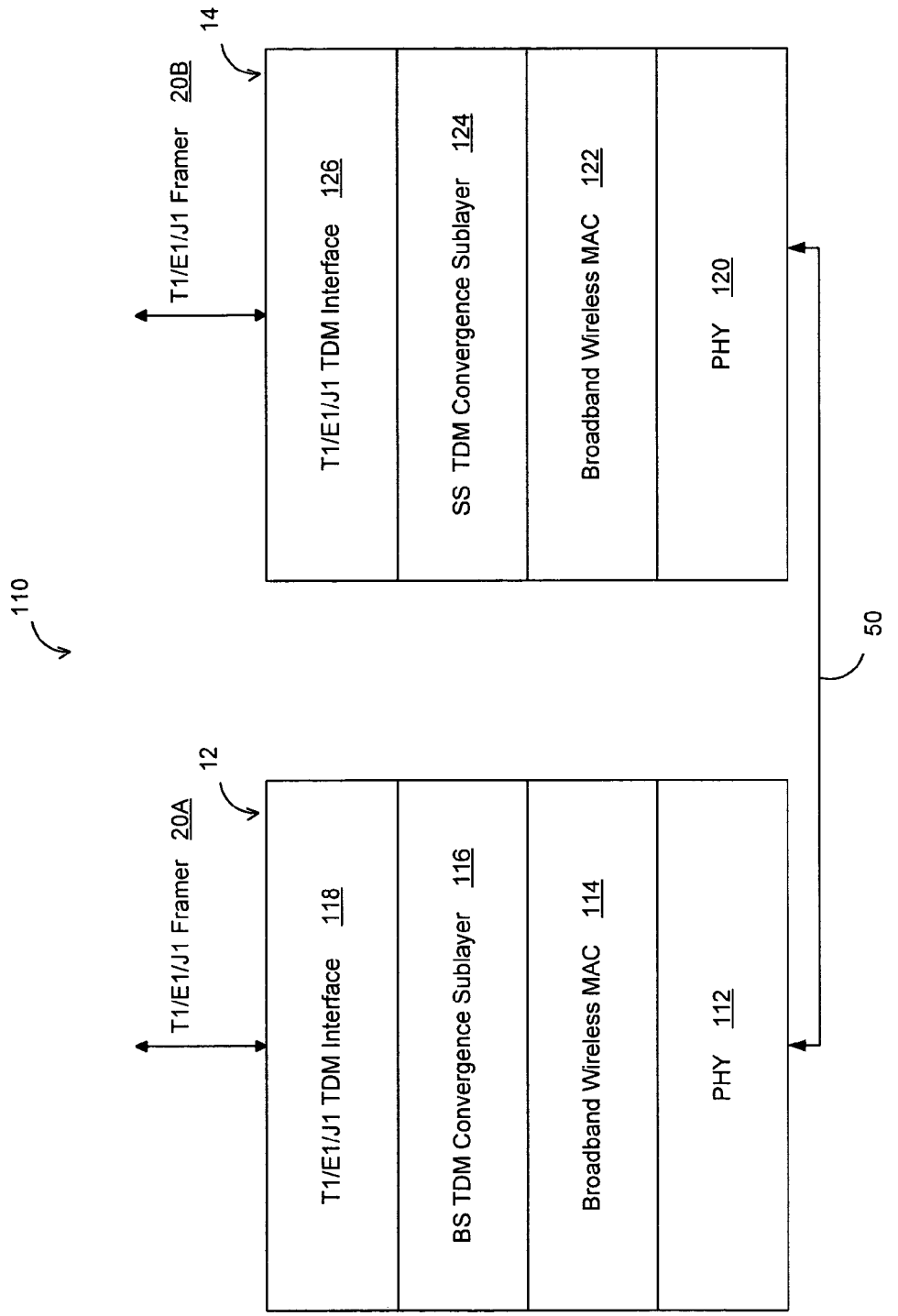
FIG. 5 is a layered model of the broadband wireless access system of FIG. 1 according to one embodiment of the present invention.

Referring to FIG. 5, a layer model 110 for the BWA system 10 of FIG. 1 is shown. Communication systems are often modeled in layers. Each layer may provide a specific task for the communication systems and interfaces with its lower and higher layers through standardized protocols. One example of these layers is the Opens Systems Interconnect (OSI) model, which will be used in the discussion hereinafter. The base station 12 may include a physical (PHY) layer 112, a broadband wireless media access control (MAC) layer 114, a BS TDM convergence sublayer 116, and a T1/E1/J1 TDM interface layer 118 which interfaces with a base T1/E1/J1 framer 20A. Likewise, the subscriber station 14 may have corresponding layers of a PHY layer 120, a broadband wireless MAC layer 122, a SS TDM convergence sublayer 124, and a T1/E1/J1 TDM interface 126 which interfaces with a subscriber T1/E1/J1 framer 20B. The wireless medium or link 50 is shown coupling the base and subscriber stations 12 and 14. The convergence sublayer 116 of the base station 12 may collect data from the TDM interface layer 118 and map the data into a single format for the downstream MAC layer 114. From the MAC layer 114, the data may be provided to the physical layer 112 as physical layer frames. The physical layer 112 may process the frames into encoded wireless frames that may be transmitted over the wireless link 50 to the subscriber station 14. At subscriber station 14, the physical layer 120 may receive the encoded wireless frames, transform them into a form readable by components in the physical layer 120, and then transfer the data through various layers 122 through 126.

Referring to FIGS. 2 and 5, in one embodiment, the above-described synchronization algorithm may be implemented in the convergence sublayers 116 and 124. As previously described with respect to the TDM unit 22, the data information for each of the subscriber stations 14 may be multiplexed into the same data stream and then extracted by each subscriber station 14 based on the time slot assigned to it. This extraction process may be undertaken by the modem 26 when the frame (also referred to as PDU) is received by the modem 26. The modem 26 may send this frame to the MAC layer 122 and the MAC layer 122 may decode it based on a connection identifier (CID) of the data frame and direct it to the appropriate convergence sublayer. For example, internet protocol (IP) packets may have one CID, while T1/E1/J1 frames may have another CID. Using the CID, the T1/E1/J1 frames may be sent to the TDM convergence sublayer 124, while IP packets may be send to an IP convergence sublayer (not shown). In summary, the TDM convergence sublayers 116 and 124 may communicate with the base and subscriber TDM units 22, respectively, with the TDM units 22 supporting T1/E1/J1 lines.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus, comprising:
a base modem clock counter responsive to a base modem clock signal to generate base modem clock period data, wherein the base modem clock period data includes a first modem clock period reading of the base modem clock counter taken at a first frame pulse and a second modem clock period reading of the base modem clock counter taken at a second frame pulse;
a base frame clock counter, coupled to the base modem clock counter,
responsive to a base frame clock signal to generate base frame clock period data, wherein the base frame clock period data includes a first frame clock period reading of the base frame clock counter taken at the first frame pulse and a second frame clock period reading of the base frame clock counter taken at the second frame pulse; and
a base logic module coupled to the base frame clock counter and the base modem clock counter, to determine a first difference between the first and second base modem clock period readings and a second difference between the first and second base frame clock period readings, and to generate a protocol data unit (PDU) which is transmitted to a subscriber unit to facilitate clock synchronization, wherein the PDU includes the first difference and the second difference.

2. The apparatus according to claim 1, further comprising:
a base frame clock source to generate the base frame clock signal; and
a base frame clock counter, coupled to the base frame clock source, and responsive to the base frame clock signal to generate the base frame clock period data.

3. The apparatus according to claim 1, further comprising:
a base modem clock source to generate the base modem clock signal; and
a base modem clock counter, coupled to the base modem clock source, and responsive to the base modem clock signal to generate the base modem clock period data.

4. The apparatus according to claim 1, further comprising:
a frame pulse source coupled to the base modem clock counter and the base frame clock counter to generate the first frame pulse and the second frame pulse.

5. The apparatus according to claim 1, further comprising a base modem, and the base modem is responsive to the base modem clock signal and a data frame to generate a modulated signal, wherein the base logic module is further designed to cause the base modem to transmit the PDU to the subscriber unit.

6. The apparatus according to claim 5, wherein the modulated signal includes the PDU.

7. A method comprising:
generating a subscriber modem clock signal with a subscriber modem clock source at a subscriber station that is synchronized to a base station modem clock signal;
receiving and demodulating a modulated signal at the subscriber station to extract a demodulated data frame and a demodulated relative change relationship, wherein the demodulated relative change relationship includes a first value being a difference between a value of a base station modem clock counter at a first frame pulse and a second frame pulse, and a second value being a difference between a base station frame clock counter at the first frame pulse and the second frame pulse;
generating a subscriber frame clock signal with a subscriber frame clock source at the subscriber station; and
adjusting a frequency of the subscriber frame clock source based in part upon the demodulated relative change relationship.

8. The method according to claim 7, wherein the adjusting of the frequency of the subscriber frame clock source based in part upon the demodulated relative change relationship includes:
counting a plurality of clock periods of the subscriber modem clock signal with a subscriber modem clock counter;
counting a plurality of clock periods of the subscriber frame clock signal with a subscriber frame clock counter;
reading the subscriber frame and the subscriber modem clock counters during a first subscriber sample time to generate a first subscriber frame clock counter reading and a first subscriber modem counter reading, respectively;
reading the subscriber frame and the subscriber modem clock counters during a second subscriber sample time to generate a second subscriber frame clock counter reading and a second subscriber modem clock counter reading, respectively;
determining a first subscriber difference between the first and the second subscriber frame clock counter readings and a second subscriber difference between the first and the second subscriber modem clock counter readings; and
adjusting the frequency of the subscriber station frame clock to make a ratio of the first and the second subscriber differences substantially equal to a ratio of the first and the second base differences.

9. The method according to claim 7, wherein the adjusting of the frequency of the subscriber frame clock source based in part upon the demodulated relative change relationship includes computing a rate adjustment for the subscriber frame clock source based upon the demodulated relative change relationship, the subscriber modem clock signal, and the subscriber frame clock signal; and using the rate adjustment to adjust the frequency of the subscriber frame clock source.

10. A system, comprising:
a substantially omnidirectional base antenna designed to facilitate transmission of a modulated signal; and
a base station coupled to the base antenna, including a base frame clock source to generate a base frame clock signal, a multiplexer unit to sample a data frame in response to the base frame clock signal; a base modem clock source to generate a base modem clock signal; a base logic module to determine a relative change relationship between the base frame and the base modem clock signals
wherein the relative change relationship is a first delta value and a second delta value, the first delta value being a difference between a base modem clock counter at a first sample time and a second sample time, and the second delta value being a difference between a base frame clock counter at the first sample time and the second sample time; and a base modem, coupled to the base modem clock source and the base logic module, to generate the modulated signal including the data frame and the relative change relationship, whereby the relative change relationship is transmitted to the subscriber unit to facilitate clock synchronization.

11. The system according to claim 10, further comprising:
a base modem clock counter coupled to the base modem clock source to count a plurality of clock periods of the base modem clock signal;

a base frame clock counter coupled to the base frame clock source to count a plurality of clock periods of the base frame clock signal; and wherein the base logic module is coupled to the base modem clock counter and the base frame clock counter.

12. The system according to claim 11, wherein the base logic module is designed to:
   read the base frame and the base modem clock counters during a first base sample time to generate a first base frame clock counter reading and a first base modem clock counter reading, respectively;
   read the base frame and the base modem clock counters during a second base sample time to generate a second base frame counter reading and a second base modem clock counter reading, respectively; and
   determine a first base difference between the first and the base second frame clock counter readings and a second base difference between the first and the second base modem clock counter readings, with the relative change relationship including the first and the second base differences.

13. An article comprising a storage medium; and a plurality of instructions stored in the storage medium, the plurality of instructions configured to implement, when executed:
   a logic module responsive to a base frame clock signal from a base frame clock source and a base modem clock signal from a base modem clock source to determine a relative change relationship between the base frame clock signal and the base modem clock signal,
   wherein the relative change relationship is a first delta value and a second delta value, the first delta value being a difference between a base modem clock counter at a first sample time and a second sample time, and the second delta value being a difference between a base frame clock counter at the first sample time and the second sample time; and
   the logic module being designed to include the relative change relationship in a data packet which is transmitted to the subscriber station, whereby the relative change relationship is transmitted to the subscriber unit to facilitate clock synchronization.

14. The article according to claim 13, wherein the plurality of programming instructions, when executed are further designed to configure the logic module to:
   read a frame clock counter and a modem clock counter during a first sample time to generate a first frame clock counter reading and a first modem clock counter reading, respectively;
   read the frame clock counter and the modem clock counter during a second sample time to generate a second frame counter reading and a second modem clock counter reading, respectively; and
   determine a first difference between the first and the second frame clock counter readings and a second difference between the first and the second modem clock counter readings, with the relative change relationship being a relative relationship between the first and the second differences.

* * * * *

UNITED STATES PATENT AND TRADEMARK OFFICE
CERTIFICATE OF CORRECTION

PATENT NO. : 7,577,222 B2  
APPLICATION NO. : 11/131660  
DATED : August 18, 2009  
INVENTOR(S) : Mathew et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Seventh Day of September, 2010

David J. Kappos  
*Director of the United States Patent and Trademark Office*